US006649107B2

(12) United States Patent
Harrison et al.

(10) Patent No.: US 6,649,107 B2
(45) Date of Patent: Nov. 18, 2003

(54) DECORATIVE COMPONENTS HAVING AN ELASTOMERIC OUTER SURFACE AND METHODS OF MAKING SUCH COMPONENTS

(75) Inventors: Richard P. Harrison, Lincoln Park, MI (US); Joseph Ogonowski, Newport, MI (US); Jon P. Pavlinac, South Lyon, MI (US); L. Patrick Chang, Flat Rock, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/174,483

(22) Filed: Jun. 18, 2002

(65) Prior Publication Data

US 2002/0192452 A1 Dec. 19, 2002

Related U.S. Application Data

(62) Division of application No. 09/124,328, filed on Jul. 29, 1998, now Pat. No. 6,432,543.

(51) Int. Cl.⁷ ............................................. B32B 27/00
(52) U.S. Cl. .................... 264/241; 525/440; 525/443; 525/454; 428/319.9; 428/423.1
(58) Field of Search .................... 525/440, 443, 525/454; 264/241; 428/319.9, 423.1

(56) References Cited

U.S. PATENT DOCUMENTS

| | | | |
|---|---|---|---|
| 4,410,667 A | 10/1983 | Porter, Jr. et al. |
| 4,410,668 A | 10/1983 | Piccirilli et al. |
| 4,419,407 A | 12/1983 | Piccirilli et al. |
| 5,028,006 A | 7/1991 | DeWinter et al. |
| 5,071,683 A | 12/1991 | Verwilst et al. |
| 5,116,557 A | 5/1992 | Debaes et al. |
| 5,292,778 A | 3/1994 | Van Veen et al. |
| 5,849,835 A | 12/1998 | Das et al. |
| 5,885,662 A | 3/1999 | Gardner, Jr. |
| 6,036,879 A | 3/2000 | Lawrey et al. |
| 6,066,683 A | 5/2000 | Beisner et al. |

FOREIGN PATENT DOCUMENTS

| | | |
|---|---|---|
| EP | 0 303 305 B1 | 2/1989 |
| WO | WO 93/23237 | 5/1992 |

Primary Examiner—Elizabeth M. Cole
(74) Attorney, Agent, or Firm—Fernando A. Borrego

(57) ABSTRACT

The aromatic polyurethane elastomers of the present invention are particularly suited for methods of making objects in a mold cavity. The objects generally include an elastomeric layer formed from an aromatic polyurethane and a foam layer which is subsequently applied to the elastomer. The aromatic elastomer of the present invention lends itself to being precoated with an in-mold coating or being painted after demolding the resulting part.

14 Claims, No Drawings

DECORATIVE COMPONENTS HAVING AN ELASTOMERIC OUTER SURFACE AND METHODS OF MAKING SUCH COMPONENTS

RELATED APPLICATIONS

This patent application is a divisional of application Ser. No. 09/124,328, which was filed on Jul. 29, 1998 and issued as U.S. Pat. No. 6,432,543 on Aug. 13, 2002.

BACKGROUND OF THE INVENTION

1. Technical Field

The present invention relates to decorative components and, more particularly, to decorative automotive components having a molded elastomeric outer layer. The invention also relates to methods of making such decorative components.

2. Discussion of the State of the Art

A recent trend in the automobile industry has been the development of various non-fabric automotive trim components. Among the known systems for producing decorative components are polyvinyl chloride (PVC) vacuum and rotocast systems, thermoplastic polyolefin (TPO) vacuum formed systems, thermoplastic polyurethane (TPU) rotocast and sprayed aliphatic urethane systems generally. However, each of the foregoing systems present certain perceived drawbacks. For example, the known PVC vacuum form and rotocast systems are initially considered undesirable in that PVC is considered to be difficult to recycle and environmentally unfriendly, i.e., subject to releasing dioxins and other chlorinated by-products upon decomposition. Further, an unnecessarily thick skin is required to minimize the effects of plasticizer loss over time. PVC skins, particularly those which are vacuum formed, are often stiff and have a poor feel.

TPO vacuum formed systems are also often stiff and have a poor feel. Further, the grain definition of the resultant components are considered to be poor in quality. Additionally, TPO skins must often be coated to improve their resistance to scratch and mar resulting in increased costs and labor.

Accordingly, U.S. Pat. No. 5,116,577 to Dabaes et al. attempted to address many of the aforementioned drawbacks seen in PVC and TPO systems, as well as certain integral skin applications by developing a method for manufacturing mold components having a relatively low density, i.e., less than 700 g/dm³. The method is said to involve applying a layer of light stable polyurethane elastomer having a predetermined color onto a mold surface by spraying and thereafter injecting in the space of the mold cavity while the elastomer is still tacky a synthetic foam composition. Upon curing of both the elastomer layer and the synthetic foam, the resultant object is removed from the mold.

While the Dabaes patent arguably provides for an advancement in the art, certain perceived drawbacks are seen regarding its teachings. For example, the required use of a light stable aliphatic polyurethane elastomers for the external layer of the object is believed to greatly increase the cost of the resulting component. Further, the resulting elastomer often requires additional treatment to achieve adhesion to a urethane foam. Other perceived drawbacks include poor color matching with other components, poor fogging resistance, and poor feel due to the relatively thick skins that are typically achieved in practice.

SUMMARY OF THE INVENTION

In view of the foregoing, the compositions utilized to form the decorative components according to the methods of the present invention are believed to offer a significant cost savings, uniform color and gloss, excellent green strength and a high grain definition. The decorative components also exhibit excellent softness and feel and are generally resistant to runs and sagging. The elastomer compositions employed in accordance with the teachings of the present invention are readily processable and offer excellent adhesion to a variety of coatings and urethane foams used as backing layers.

According to a first aspect of the invention, a sprayable elastomer composition is described as comprising:

the reaction product of:
  a) an aromatic isocyanate;
  b) a solids containing polyol selected from the group consisting of graft polyols, polyisocyanate polyaddition polyols, polymer polyols, PHD polyols and mixtures thereof;
  c) a polyol composition other than b); and
  d) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof;
wherein the solid contents of all components other than a) is up to 40.0 weight percent.

Preferably, the reaction product will include between about 5.0 weight percent to about 70.0 weight percent of a solid containing polyol based on the total amount of all components other than a).

According to another aspect of the present invention, a sprayable elastomer composition is disclosed as comprising:
  a) an aromatic isocyanate;
  b) a polyol composition including one or more polyols selected from the group consisting of polyether, polyester, polytetrahydrofuran, amine functional polyols and mixtures thereof, said polyol having a number average molecular weight of from about 100 to about 10,000;
  c) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof;
wherein said elastomer has an elongation after heat aging at 121° C. for 500 hours of at least 150 percent.

According to another aspect of the invention, a method of making a decorative component in a mold cavity is disclosed as comprising the steps of:
  a) applying a first coating composition having a predetermined color to said mold cavity;
  b) applying an aromatic elastomer composition over said coating in said mold cavity and allowing said elastomer to cure to form an elastomeric layer; and
  c) optionally demolding the resulting component.

Thereafter, either while the component remains in the mold cavity or after removal of the decorative component, a polyurethane foam composition having the desired density characteristics can be applied to the elastomeric layer to form a backing layer. Subsequent coating applications can also be applied over said first coating if desired.

Under an alternative method of the present invention, a decorative component can be formed in a mold having a mold cavity by the steps of:
  a) applying an aromatic elastomer composition over a surface of said mold cavity and allowing said elastomer composition to at least partially cure to form an elastomeric layer;

b) introducing a polyurethane foam composition to said mold cavity and applying said foam composition to said at least partially cured elastomeric layer to form a backing layer on said component; and c) demolding the resulting component.

A coating composition can then be applied to the elastomeric layer after the decorative component is demolded.

Additional benefits and advantages of the present invention will become apparent from a reading of the description of the preferred embodiments taken in conjunction with the specific examples provided.

DETAILED DESCRIPTION OF THE INVENTION

The aromatic elastomer composition of the present invention includes an isocyanate component a) which generally corresponds to the formula R' $(NCO)_z$ wherein R' is a polyvalent organic radical which is aromatic and z is an integer which corresponds to the valence of R' and is at least 2. Representative of the types of organic polyisocyanates contemplated herein include, for example, bis(3-isocyanatropropyl) ether, 4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisochyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate; the triisocyanates such as 4,4',4"-triphenylmethane triisocyanate polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate, and mixtures thereof.

The polyisocyanate component is preferably a modified multivalent isocyanate, i.e., product which is obtained through chemical reactions of the above diisocyanates and/or polyisocyanates. Examples include polyisocyanates containing the following groups: esters, ureas, biurets, allophanates and preferably carbodiimides, uretonimines, isocyanurate and/or urethane group containing diisocyanates and/or polyisocyanates. Individual examples are: aromatic polyisocyanates containing urethane groups, having NCO contents of from 8 to 33.6 weight percent, more preferably of from 18 to 25 weight percent, for example with diols, triols, oxyalkylene glycols, dioxyalkylene glycols, polyoxyalkyleneglycols, polyester polyols or polytetrahydrofuran having molecular weights up to 6000, modified 4,4'-diphenylmethanediisocyanate or toluenediisocyanate, whereby they are able to be employed individually or in mixtures as di- and/or polyoxyalkyleneglycols. Individual examples of the polyoxyalkyleneglycols include diethylene glycols, dipropylene glycols, polyoxyethylene glycols, polyoxypropylene glycols and polyoxypropylenepolyoxethylene glycols. Suitable also are prepolymers containing NCO groups, having NCO contents of from 8 to 25 weight percent, more preferably of from 14 to 21 percent. Also suitable are polyisocyanates containing liquid carbodiimide-uretonimine groups and/or isocyanurate rings, having NCO contents of from 8 to 33.6 weight percent, more preferably from 21 to 31 weight percent, for example, based on 4,4'-, 2,4'- and/or 2,2'-diphenylmethanediisocyanate and/or 2,4- and/or 2,6-toluenediisocyanate and preferably 2,4- and 2,6-toluenediisocyanate, as well as the corresponding isomeric mixtures 4,4'-, 2,4'- and 2,2'-diphenylmethanediisocyanate, as well as the corresponding isomeric mixtures for example from 4,4'- and 2,4'-diphenylmethanediisocyanates; mixtures of diphenylmethanediisocyanates and polyphenylpolymethylenepolyisocyanates (polymeric MDI) and mixtures of toluenediisocyanates and crude MDI. These quasi-prepolymers are prepared by reacting an excess of organic polyisocyanate or mixtures thereof with a minor amount of an active hydrogen containing compound as determined by the well known Zerewitinoff test as described by Kohler in Journal of the American Chemical Society, 49, 3181 (1927).

Most preferably used are: (i) polyisocyanates containing carbodiimide-uretonimine groups and/or urethane groups, from 4,4'-diphenylmethanediisocyanate or a mixture of 4,4'- and 2,4'-diphenylmethanediisocyanates having an NCO content of from 8 to 33.6 weight percent; (ii) prepolymers containing NCO groups, having an NCO content of from 8 to 27 weight percent, based on the weight of the prepolymer, prepared by the reaction of polyoxyalkylene polyols, having a functionality of from 2 to 4 and a molecular weight of from 600 to 6000 with 4,4'-diphenylmethane diisocyanate or with a mixture of 4,4'- and 2,4'-diphenylmethane diisocyanates and mixtures of (i) and (ii).

The reaction product, under a first embodiment, also includes a solids containing polyol b) including up to about 40.0 weight percent solids based on a total of all components other than the polyisocyanate component. Higher solids content tends to result in viscosities which are not suitable for sprayable elastomeric compositions, among other perceived difficulties such as the agglomeration of the graft solids, for example.

The phrase "solids containing polyol" as used herein is intended to mean polyether polyols including organic fillers in dispersed distribution, wherein the filler material is at least in part chemically bound to the polyether. These so called solids containing polyols are preferably selected from the group consisting of graft polyols, polyisocyanate polyaddition (PIPA) polyols, polymer polyols and PHD polyols and mixtures thereof.

The graft polymer dispersions, otherwise referred to herein as graft polyols, are generally prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostryrene, benzylstyrene, and the like; substitute styrenes such as cyanostyrene, nitrostyrene, N,N-dimethylaminostyrene, acetoxystyrene, methyl 4-vinylbenziate, phenoxystyrene, p-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl-pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 30 percent to 50 percent, based on the total weight of the product. The polymerization occurs at a temperature between about 25° C. and 180° C., preferably from 80° C. to 135° C.

The unsaturated polyols or macromers which may be employed in preparing the graft polymer dispersion may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butane-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-butane-3, 4-diol, unsaturated epoxides such as 1-vinyl-cyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether).

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramethane hydroperoxide, diacetyl peroxide, di-α-cunyl peroxide, dipropyl peroxide, diisopropyl peroxide, isopropyl-t butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis(cyclohexane carbonitrile), 4,4'-azo-bis(4-cyanopentanoic acid), 2,2'-azobis(isobutyronitrile), 1-t-butylazo-1-cyanocyclohexane, persuccinic acid, diisopropyl peroxydicarbonate, 2,2'-azobis (2,4-dimethylvaleronitrile), 2-t-butylazo-2-cyano-4-methoxy-4-methylpentane, 2,2'-azobis-2-methylbutane-nitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-s-cyano-4-methylpentane, 2-t-butylazo-2-isocutyronitrile, to butylperoxyisopropyl carbonate and the like; a mixture of initiators may also be used. The preferred initiators are 2,2'-axobis(2-methylbutyronitrile), 2,2'-axobis (isobutyronitrile), 2,2'-axobis(s,4-demethylvaleronitrile), 2-t-butylazo-2-cyano-4-methylpentane, 2-t-butylazo-2-cyano-butane and lauroyl peroxide, Generally, from about 0.1 percent to about 10 percent, preferably from about 1 percent to about 4 percent, by weight of initiator based on the weight of the monomer will be employed in the process of the invention.

By way of non-limiting example, useful commercial graft polyol formulations include Pluracol® 1198, Pluracol® 1218, Pluracol® 1409 and Pluracol® 1413, each of which are available from BASF Corporation.

Polyaddition polyols as the phrase is used herein is intended to mean the reaction product of an isocyanate and an olamine dispersed in a polyol composition. The polyaddition polyol dispersions preferably have a viscosity in the range of about 4,000 to about 50,000 mPas. In addition to known isocyanate components such as those noted herein, the olamine component may, for example, be any one of a number of alkanolamines such as monoethanolamine, diethanolamine, dimethylethanolamine, triethanolanine, N-methylethanolamine, N-ethylethanolamine, N-butylethanolamine, N-methyldiethanolamine, N-ethyl-diethanolamine, monoisopropanolamine, diisopropanolamine, triisopropanolamine, N-methylisopropanolamine, N-ethylisopropanolamine, N-propylisopropanolamine and mixtures thereof. The choice of polyol suitable for the dispersion in a vat and should be within the purview of the skilled artisans as suggested by U.S. Pat. No. 5,292,778 which is hereby incorporated by reference.

PHD polyols as the phrase is used herein is intended to mean the reaction product of an isocyanate and either a diamine or hydrazine to form polymer or polyhydrazodicarbonamide dispersions in polyol produced as a result of free radical polymerization employing olefinic monomers with polyester serving as the base. Thus, the polymer polyols include the grafted copolymer along with homopolymers of one or more olefins dispersed in unaltered polyether.

For a further understanding of the PHD polyols which are useful in accordance with the teachings of the present invention,--reference can be made to the various PHD polyols disclosed in U.S. Pat. Nos. 4,089,835 and 4,260,530, both of which are fully incorporated herein by reference.

The aromatic elastomer composition according to the first embodiment of the present invention also comprises c) a polyol composition. Additionally, under a second embodiment of the present invention, the sprayable elastomer can be prepared using certain specified polyols absent any of the so called solids containing polyols. The polyol composition (exclusive of solids) generally includes one or more polyol components which are prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters and polycarbonates, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia and amines including aromatic, aliphatic and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the number average molecular weight of the polyols will vary from 400 to 10,000.

Suitable hydroxy-terminated polyesters may be used such as those prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, αhydromuconic acid, β-hydromuconic acid, α-butyl-α-ethyl-glutaric acid, α,β-diethylsuccinic acid, isophthalic acid, therephthalic acid, hemimellitic acid and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,-trimethylolethane, 1,2,6-hexanetriol, α-methyl glucoside, pentaerythritol, and sorbitol. Also included within the term "polyhydric alcohols" are compounds derived from phenol such as 2,2-bis(4-hydroxylphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Any suitable alkylene oxide may be used such as those disclosed above for preparing the prepolymers. Examples of alkylene oxides include ethylene oxide, propylene oxide, butylene oxide, amylene oxide, mixtures thereof, tetrahydrofuran, alkylene oxide-tetrahydrofuran mixtures, epihalohydrins and aralkylene oxides such as styrene oxide. Polyethers which are particularly suitable include the alkylene oxide addition products of trimethylolpropane, glycerine, propylene glycol, dipropylene glycol; sucrose and blends thereof having number average molecular weights of from 1000 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehydes with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Polyols having initiator molecules containing nitrogen may be used in the elastomeric compositions of the present invention. Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene (TDA) and mixtures of the isomers; and aliphatic amines such as methylamine, triisopropanolamine, ethylenediamine, 1,3-diaminopropane, 1,3-diaminobutane, and 1,4-diaminobutane. Polyethers having aromatic amines as initiator molecules are also suitable.

Polyols containing ester groups can also be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542, The aromatic elastomer composition of the present invention also optionally includes d) one or more components selected from the group consisting of catalysts, chain extenders, defoamers, surface-active agents, adhesion promoters, flame retardants, anti-oxidants, water scavengers, dyes, ultraviolet stabilizers, pigments, fillers, thixotropic agents and mixtures thereof. As additional components c) are employed, the total solids content may increase such that the total solids content of all components other than the isocyanate component a) is up to about 40.0 weight percent.

The use of chain extenders, while optional, is highly preferred. Examples of suitable chain extenders include those compounds having at least two functional groups bearing active hydrogen atoms such as water, hydrazine, primary and secondary diamines, amino alcohols, amino acids, hydroxy acids, glycols, or mixtures thereof. Such agents will generally have a number average molecular weight of less than about 400. A preferred group of chain extending agents include water, ethylene glycol, 1,4-butanediol, glycerine and mixtures thereof.

While the amount of chain extenders employed is in large part determined by the anticipated end use of the elastomers, in general the elastomeric composition of the present invention will include between about 4.0 to about 20.0% chain extender, more preferably from about 6.0 to about 15.0% and still more preferably from about 8.0 to about 12.0% by weight.

The use of catalysts is highly preferred. Examples of suitable amine-based catalysts which may be used include tertiary amines such as, for example, triethylenediamine, N-methylmorpholine, N-ethylmorpholine, diethylethanolamine, N-cocomorpholine, 1-methyl-4-dimethylaminoethylpiperizine, 3-methoxypropyldimethylamine, N,N,N'-trimethylisopropyl propylenediamine, 3-diethylaminopropyidiethylamine, dimethylbenzylamine, and the like. Other suitable catalysts are the metal based catalysts, for example, stannous chloride, dibutyltin di-2-ethyl hexanoate, stannous oxide, as well as other organometallic compounds including potassium, zinc, mercury and lead based catalysts. Other useful catalysts are disclosed in U.S. Pat. No. 2,846,408 which is hereby incorporated by reference.

Preferred catalysts however, are those commercially available amine catalysts such as DABCO® EG, DABCO® HG, DABCO® 33LV and POLYCAT® 17 which are commercially available from Air Products Corporation. Particularly suitable metal based catalysts are dioctyltin dimercaptin commercially available as FOMREZ® UL-32 catalyst and other tin catalysts and various BICAT® catalysts which are bismuth carboxylate, zinc carboxylate catalysts and mixtures thereof available from Shepherd Chemical Company. The most preferred catalyst will be a mixture of amine and metal based catalysts.

Examples of suitable UV light stabilizers which may be used include by way of non-limiting example Tinuvin® 144, Tinuvin® 328, Tinuvin® 765, Tinuvin® 770, all of which are commercially available from Ciba Specialty Chemicals Corporation. The UV light stabilizer may be used in amounts of up to 2.0 weight % of the elastomeric composition, with 0.25 weight % to about 0.75 weight % being preferred. Among the commercially available anti-oxidants which are considered useful are UVINUL® A03 available from BASF Corporation and IRGANOX® 1010 and IRGANOX® 1098, each of which are available from Ciba Specialty Chemicals Corporation. The anti-oxidants, otherwise referred to herein as heat stabilizers, may be used in amounts of up to 2.0 weight percent of the elastomeric composition, with 0.25 weight percent to 0.75 weight percent being preferred.

The isocyanate component (a) and the resin component including both the polyol component b) and optional auxiliaries c) will generally be combined in an index of from 80 to 120, and preferably an index of from 90 to 110. The most preferred index for the aromatic elastomer composition will be from 95 to 105, where 100 index refers to the stoichiometric ratio, 90 index refers to 90 percent of the isocyanate required for a stoichiometric ratio and so on.

Referring to FIG. 1, there is shown a first embodiment of the method of manufacturing decorative components having an elastomeric outer layer. Initially, the mold surface may be coated with a known mold release agent by means of a spray gun in order to facilitate the eventual demolding of the resultant decorative object. By way of non-limiting example, the mold release agent may be a composition including silicones, soaps, waxes and/or solvents.

Alternatively, or in addition to the application of the mold release agent, the mold cavity may be coated with a coating composition having a predetermined color utilizing a spray gun. The coating composition, otherwise referred to herein as an in mold coating may be selected from a variety of water and solvent borne solutions. For example, the coating may be a one or multi-component composition based on enamel or urethane coating compositions, the latter being particularly preferred.

Among the numerous commercially available coating compositions which have proven useful are those marketed under the following trade names: Protothane® which is available from Titan Finishes Corp.; Polane® which is available from Sherwin Williams, Inc.; and Rimbond® which is available from Lilly Corp., by way of non-limiting example.

The aromatic elastomer composition is preferably mixed by impingement mixing with or without the additional mixing achieved by the use of subsequent static mixers and is applied over the mold release agent and/or coating composition if present and, in the absence thereof, directly to a surface of the mold cavity by means of a spray gun or other spraying device to form the elastomeric outer layer. Depending largely on the intended use of the resulting decorative object, the thickness of the elastomeric outer layer is between about 0.2 and 3.0 mm and preferably between about 0.3 mm and 1.2 mm. Further, the elastomeric layer will preferably have a density of less than 1000 kg/M$^3$, a Shore A durometer hardness of less than 86, a tensile strength of greater than 8.8 MPas and a tear strength of greater than 40 kn/m.

After applying the aromatic elastomer composition to the surface of the mold cavity, a polyurethane foam composition may be injected into the mold cavity to form a backing layer on the elastomer outer layer. Alternatively, the polyurethane foam composition may be applied by spray coating the elastomer prior to or after removing the elastomeric layer from the mold.

The polyurethane foam composition can be tailored to meet the customer's requirements in terms of density, crush resistance and other important characteristics. As such, the foam's density can be controlled independent of the elastomeric outer layer which is not true with regard to integral skin foams.

Polyurethane foam compositions which are considered useful for forming a backing layer on the elastomer outer layer include those disclosed in U.S. Pat. Nos. 4,389,454 and 5,512,319, which are hereby expressly incorporated by reference. The spray processing parameters of the present invention will generally fall within specific ranges to insure the quality of the resulting components. For example, it is preferred that the mold and elastomer composition temperatures each be maintained at from about 25° C. to about 85° C., with a range of 55° C. to 70° C. being preferred. Likewise, the chemical pressures as the elastomeric composition enters the spray gun should be between about 48 to about 140 bar, with a range of 60 to 100 bar being preferred. The throughput is generally between 5 g/sec to about 10 g/sec, with 10 g/sec to 30 g/sec being preferred. Each of the foregoing processing parameters work best for elastomeric compositions having viscosities up to 4000 cps at 25° C., with the viscosities more preferably ranging from 10 to about 2000 cps at 25° C.

The working examples set forth in Table 1 below illustrate the manner and process of making and using the invention and set forth the currently known best mode contemplated by the inventors of carrying out the invention, however the examples are not to be construed as limiting.

| | |
|---|---|
| Polyol A | is a glycerine initiated polyether polyol including propylene oxide and ethylene oxide, having a hydroxyl number of 35. and a theoretical number average molecular weight of approximately 4800. |
| Polyol B | is a dipropylene glycol initiated polyether polyol, including propylene oxide and ethylene oxide having a hydroxyl number of 29 and a theoretical number average molecular weight of approximately 3800. |
| Polyol C | is a graft polyol having 50% solids (1:1 acrylonitrile:styrene acrylonitrile) dispersed in a trimethylolpropane initiated polyether polyol. |
| Polyol D | is a linear poly(ethylene glycol 1,4-butanediol adipate initiated polyester polyol), having a hydroxyl number of 55. |
| Polyol E | is a polytetrahydrofuran polyether polyol, having a hydroxyl number of 110. |
| Bicat ® | is a bismuth neodecanoate/zinc neodecanoate catalyst including 8.0 percent bismuth and 8.0 percent zinc. |
| Dabco ® 33LV | is a 33 percent triethylenediamine, 67 percent dipropylene glycol catalyst. |
| Anti-foam A defoamer | is an amorphous silica. |
| Polycat ® 17 | is a trimethylaminopropyl ethanolamine catalyst. |
| Reactint ® brown 2222 dye | is an organic dye. |
| Fomrez ® UL-32 | is a dioctyl tin dimercaptide catalyst. |
| Plasticolors Brown 31368 | is a pigment master batch including 45.67 percent Polyol B. |
| Plasticolors DM-45791X | is a pigment master batch containing 60 percent Polyol B, 12 percent Tinuvin ® 770DF, 12 percent Tinuvin ® 328. |
| Tinuvin ® 770DF | is a hindered amine light stabilizer: bis(2,2,6,6-tetramethyl-4-piperidinyl) decanedioate. |
| Dabco ® EG | is 25 percent triethylenediamine, 75 percent ethylene glycol catalyst. |
| Dabco ® HB | is a 33 percent triethylenediamine, 67 percent 1,4 butanediol catalyst. |
| Isocyanate A | s a prepolymer including 87.0 weight percent diphenylmethane diisocyanate, 8.0 weight percent dipropylene glycol, 5.0 weight percent polyether diol and having a percent NCO of 23. |
| Isocyanate B | is a prepolymer including 56 weight percent diphenylmethane diisocyanate, 38 weight percent Polyol D, 6 percent carbodiimide modified diphenylmethane diisocyanate, 0.003 weight percent benzoyl chloride, having a percent NCO of 19. |
| LK-221 surfactant | is a non-ionic surfactant. |

-continued

| Resin System #1 | Sample 1 Sprayed | Sample 2 Sprayed | Sample 3 Sprayed | Sample 4 Cast | Sample 5 Cast |
|---|---|---|---|---|---|
| Isocyanate A | 52.2 | 50 | 86 | | 60.6 |
| Isocyanate B | | | | 61.2 | |
| Polyol A | 70.36 | 38.04 | 66.55 | | |
| Polyol B | 13.3 | 30 | | | 58.78 |
| Polyol C | | 20 | | | |
| Polyol D | | | 15 | 93.98 | |
| Polyol E | | | | | 30.0 |
| 1,4 butanediol chain extender | 10 | 10 | | | 10 |
| Ethylene glycol chain extender | | | 12 | 5 | |
| LK-221 surfactant | | | 1.5 | | |
| Bicat ® 8 catalyst | 0.04 | 0.06 | | | |
| Dabco ® 33LV catalyst | 1 | | | 1.5 | |
| Polycat ® 17 catalyst | | 0.5 | | | |
| Fomrez ® UL-32 catalyst | | | 0.05 | | 0.02 |
| Dabco ® EG catalyst | | | 1.2 | | 0.2 |
| Dabco ® HB | | | | | 1.0 |
| Anti-foam A defoamer | 0.1 | 0.1 | | | |
| Molecular sieve water scavenger | 1 | 1 | 0.7 | | |
| Plasticolors DM-45791X brown UV pigment | 4.2 | | | | |
| Reactint ® brown 2222 dye | | 0.3 | | | |
| Plasticolors brown 31368 pigment | | | 3 | | |
| Properties from Sprayed Skin | | | | | |
| Density (kg/m³) | 945 | 956 | 949 | 1086 | 1009 |
| Shore A Hardness | 72 | 77 | 86 | 70 | 80 |
| Heat aged shore A hard. (500 hrs., 121 C.) | | 78 | 87 | | |
| Tensile Strength (MPa) | 8.8 | 18.9 | 16.5 | 25.1 | 13.2 |
| Heat Aged Tensile Strength (500 hrs., 121 C.) | 8.1 | 16.4 | 19.4 | | |
| Elongation at Break (%) | 208 | 400 | 260 | 756 | 379 |
| Heat Aged Elongation (500 hrs, 121 C.) | 344 | 605 | 336 | | |
| Die C Tear Strength (kN/m) | 40 | 49.9 | 59 | 63 | 47.8 |
| Heat aged die C tear str. (500 hrs., 121 C.) | | 58.5 | 69 | | |

What is claimed is:

1. A method of making a decorative component in a mold having a mold cavity, said method comprising the steps of:
   a) applying a urethane based coating having a predetermined color to the mold cavity;
   b) applying an aromatic elastomer composition over the coating in the mold cavity and allowing the elastomer to at least partially cure to form an elastomeric layer, wherein the elastomer comprises the reaction product of
      i) an aromatic isocyanate composition,
      ii) a solids containing polyol including up to about 60.0 weight percent solids and selected from the group consisting of graft polyols, polyisocyanate polyaddition polyols, polymer polyols, PHD polyols, and mixtures thereof,
      iii) a polyol composition including at least one polyol other than b) selected from the group consisting of polyether, low unsaturation polyether, polyester, polytetrahydrofuran, amine functional polyols and mixtures thereof, the polyol having a theoretical number average molecular weight of from about 3,800 to about 10,000, and
      iv) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof; and c) demolding the resulting decorative component.

2. The method of claim 1 further comprising the steps of introducing a polyurethane foam composition into the mold cavity and applying the foam composition to the elastomeric layer to form a backing layer on the decorative component.

3. The method of claim 1 further comprising the step of applying a polyurethane foam composition to the elastomeric layer after demolding the decorative component.

4. A method of making a decorative component in a mold having a mold cavity, said method comprising the steps of:

a) applying a urethane based coating having a predetermined color to the mold cavity;

b) applying an aromatic elastomer composition over the coating in the mold cavity and allowing the elastomer to at least partially cure to form an elastomeric layer, wherein the elastomer comprises the reaction product of i) an aromatic isocyanate composition, ii) a polyol composition including one or more polyols selected from the group consisting of polyether, low unsaturation polyether, polyester, polytetrahydrofuran, amine functional polyols and mixtures thereof, said polyol having a theoretical number average molecular weight of from about 3,800 to about 10,000, and a second polyol selected from the group consisting of graft polyols, polyisocyanate polyaddition polyols, polymer polyols, PHD polyols, and mixtures thereof, wherein the solids content of the second polyol is up to about 60.0 weight percent solids, and iii) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof, wherein the elastomer has an elongation after heat aging at 121° C. for 500 hours of at least 150 percent; and c) demolding the resulting decorative component.

5. The method of claim 4 further comprising the steps of introducing a polyurethane foam composition into the mold cavity and applying the foam composition to the elastomeric layer to form a backing layer on the decorative component.

6. The method of claim 4 further comprising the step of applying a polyurethane foam composition to the elastomeric layer after demolding the decorative component.

7. A method of making a decorative component in a mold having a mold cavity, said method comprising the steps of:

a) applying an aromatic elastomer composition within the mold cavity and allowing the elastomer to at least partially cure, thereby forming an elastomeric layer, wherein the elastomer comprises the reaction product of i) an aromatic isocyanate composition, ii) a solids containing polyol including up to about 60.0 weight percent solids and selected from the group consisting of graft polyols, polyisocyanate polyaddition polyols, polymer polyols, PHD polyols, and mixtures thereof, iii) a polyol composition including at least one polyol other than b) selected from the group consisting of polyether, low unsaturation polyether, polyester, polytetrahydrofuran, amine functional polyols and mixtures thereof, the polyol having a theoretical number average molecular weight of from about 3,800 to about 10,000, and iv) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof;

b) optionally introducing a polyurethane foam composition into the mold cavity and applying the foam composition to the at least partially cured elastomeric layer to form a backing layer on the decorative component; and c) demolding the resulting decorative component.

8. The method of claim 7 further comprising the step of applying a urethane based coating to the mold cavity prior to step a).

9. The method of claim 7 further comprising the step of applying a mold release agent to the mold cavity prior to step a).

10. The method of claim 7 further comprising the step of applying a urethane based coating to the elastomeric layer after demolding the decorative component.

11. A method of making a decorative component in a mold having a mold cavity, said method comprising the steps of:

a) applying an aromatic elastomer composition within the mold cavity and allowing the elastomer to at least partially cure, thereby forming an elastomeric layer, wherein the elastomer comprises the reaction product of i) an aromatic isocyanate composition, ii) a polyol composition including one or more polyols selected from the group consisting of polyether, low unsaturation polyether, polyester, polytetrahydrofuran, amine functional polyols and mixtures thereof, said polyol having a theoretical number average molecular weight of from about 3,800 to about 10,000, and a second polyol selected from the group consisting of graft polyols, polyisocyanate polyaddition polyols, polymer polyols, PHD polyols, and mixtures thereof, wherein the solids content of the second polyol is up to about 60.0 weight percent solids, and iii) optionally one or more components selected from the group consisting of catalysts, chain extenders, defoamers, surface-active agents, adhesion promoters, flame retardants, anti-oxidants, water scavengers, dyes, ultraviolet light stabilizers, pigments, fillers, thixotropic agents and mixtures thereof, wherein the elastomer has an elongation after heat aging at 121° C. for 500 hours of at least 150 percent; and b) optionally introducing a polyurethane foam composition into the mold cavity and applying the foam composition to the at least partially cured elastomeric layer to form a backing layer on the decorative component; and c) demolding the resulting decorative component.

12. The method of claim 11 further comprising the step of applying a urethane based coating to the mold cavity prior to step a).

13. The method of claim 11 further comprising the step of applying a mold release agent to the mold cavity prior to step a).

14. The method of claim 11 further comprising the step of applying a urethane based coating to the elastomeric layer after demolding the decorative component.

* * * * *